Nov. 9, 1943.  J. V. HORR  2,333,933
EDUCATIONAL DEVICE FOR TEACHING ORIENTATION BY COMPASS
Filed March 17, 1943  2 Sheets-Sheet 1
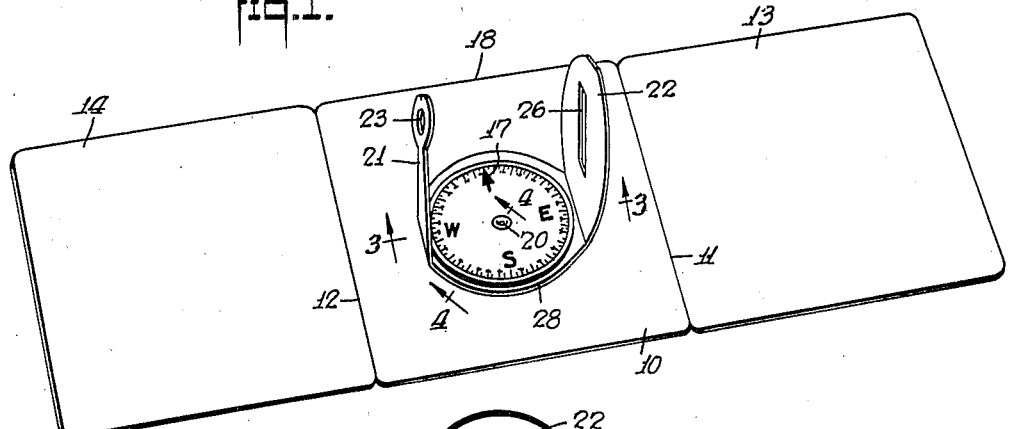
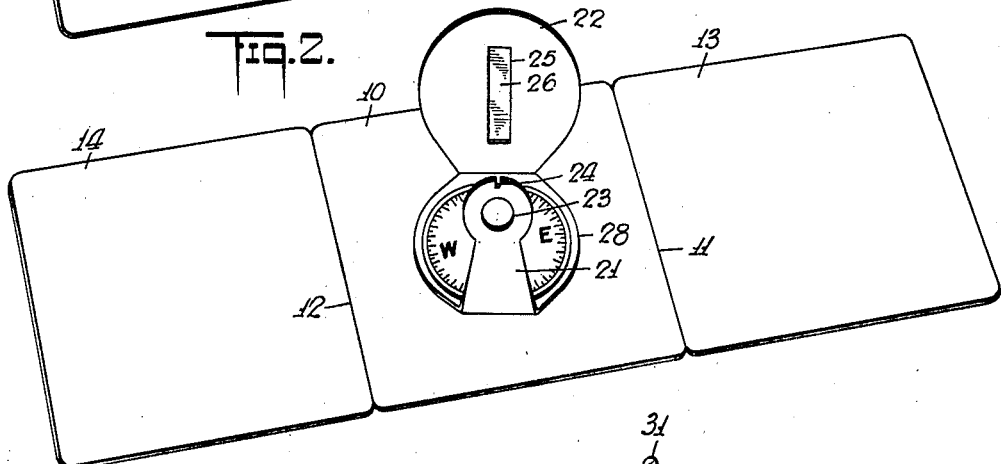
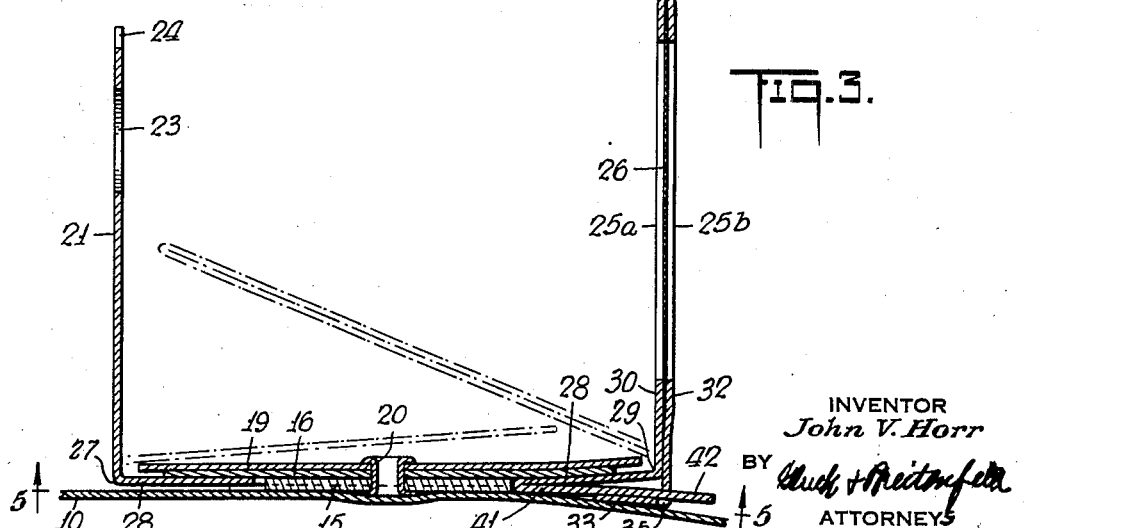
INVENTOR
John V. Horr
BY
ATTORNEYS Nov. 9, 1943.  J. V. HORR  2,333,933
EDUCATIONAL DEVICE FOR TEACHING ORIENTATION BY COMPASS
Filed March 17, 1943  2 Sheets-Sheet 2

INVENTOR
John V. Horr
BY
ATTORNEYS

Patented Nov. 9, 1943

2,333,933

UNITED STATES PATENT OFFICE 2,333,933

EDUCATIONAL DEVICE FOR TEACHING ORIENTATION BY COMPASS

John V. Horr, North Tarrytown, N. Y., assignor to Einson-Freeman Co., Inc., Long Island City, N. Y., a corporation of Delaware Application March 17, 1943, Serial No. 479,396

11 Claims. (Cl. 35—39)

My present invention relates generally to educational devices, and has particular reference to an educational device for reaching orientation by compass.

A type of compass currently in wide use consists of a case or chamber having a top wall of glass or other transparent material and accommodating a freely pivoted magnetically-movable element which is so constructed that a predetermined portion always assumes a northerly position. Generally, the pivoted element is in the form of a disk which bears on its upper surface a series of circumferentially arranged degree markings or similar compass designations. Associated with the case at diametrically opposite positions, usually in a hinged or foldable relationship to the case, are front and rear sights by means of which the user of the compass is enabled to sight along a straight line toward a selected objective. When such objective is properly sighted, its compass direction may be determined by observing the relationship which then exists between the line of sight and the compass indications on the magnetically-movable disk or element.

It is a general object of my present invention to provide an educational device by means of which this technique and the general nature and use of a compass, are taught to a student. It is a more particular object of the invention to provide a device of simple structural nature, composed entirely of relatively inexpensive material such as cardboard, whereby large quantities may be manufactured expeditiously and at low expense.

The present device is of course of non-magnetic character, and is not intended to be used as a compass, but only for instructional purposes. It consists essentially of a flat backing, a means fixedly associated with the backing and simulating the magnetically-movable element of a real compass, and cooperable front and rear sights secured in a rotatable manner to the backing. The construction is of such a character that the sights are rotatable as a unit in a circular direction around an axis concentric with the fixed compass indications, and the student is thus enabled to adjust the parts into various angular relationships simulating those which would be encountered during the actual use of a real compass.

Simplicity of structure and ease of manipulation are achieved by a special design and arrangement of parts whereby the entire educational device may be constructed at low cost of a relatively small number of flat elements composed of cardboard or the like.

I achieve the foregoing general objects and advantages, and such other objects and advantages as may hereinafter appear or be pointed out, in the manner illustratively exemplified in the accompanying drawings in which:

Fig. 1 is a perspective view of an educational device of the present character with the sights set into operative positions;

Fig. 2 is a view similar to Fig. 1 showing the sights illustratively set into an adjusted position;

Fig. 3 is an enlarged cross-sectional view taken substantially along the line 3—3 of Fig. 1;

Figure 5:
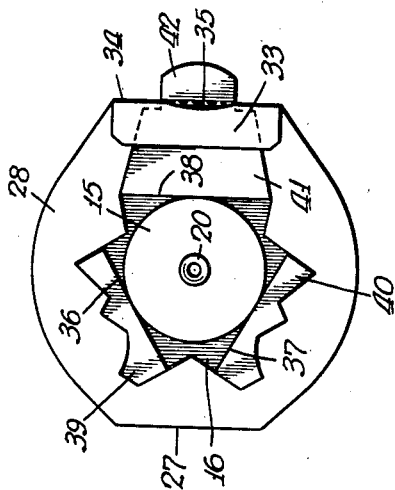
Fig. 5 is a bottom view taken substantially along the line 5—5 of Fig. 3.
Figure 4:
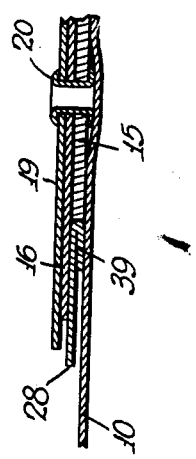
Fig. 4 is a fragmentary cross-sectional view taken substantially along the line 4—4 of Fig. 1.

In the preferred embodiment herein illustrated, I provide a flat supporting backing 10 in the form of a substantially rectangular blank of cardboard, this blank being preferably hinged as at 11 and 12 to side flaps or portions 13 and 14. The extensions 13 and 14 are not essential to the operation of the present device, but serve as a convenient means for enclosing the essential elements of the structure when it is not in use. That is, when the parts are folded into substantially flat compacted relationship on the backing 10 (this procedure being indicated by the dot-and-dash lines of Fig. 3), the flaps or extensions 13 and 14 may be folded successively downwardly onto the backing 10 to form a convenient type of folder which encloses and protects the operative portions of the device. Moreover, the extensions 13 and 14 afford desirable space for such instructions, diagrams, or other educational matter, as may be deemed advisable. The face of the backing 10 may also bear such markings or indicia as may be deemed desirable to instruct the student in the use of the device or in the use of an actual compass.

Mounted on the backing 10 is a circular disk or element 15 which may be secured in position by any convenient means such as adhesive or the like. Both the backing 10, the flaps that may be associated with it, and the element 15 may be and are preferably composed of cardboard or equivalent inexpensive sheet material. The element 15 is preferably slightly thicker than the backing 10, and is of sufficient rigidity to retain its disposition in a single plane. This element serves as a fixed circular bearing around which the movable portion of the structure is rotatable.

Overlying the element 15, and secured thereto in any convenient manner, as by adhesive or the like, is a disk 16 of circular contour, this disk being also composed of cardboard or its equivalent. The disk 16 is larger than the element 15, and is concentrically mounted on the element 15, so that an annular space is provided around the bearing 15 and between the backing 10 and the disk 16.

The disk 16 bears on its upper face a set of circumferentially-arranged degree markings or equivalent compass indications, as indicated most clearly in Figs. 1 and 2. Being fixed to the element 15 and to the backing 10, these degree markings always retain the same relationship to the backing 10. Thus, in the illustrated device, the "north" designation 17 (Fig. 1) has been shown in the form of an arrow pointing toward the midportion of the edge 18 of the backing 10.

It may be desirable, under certain circumstances, to mount a transparent protective disk 19 upon the disk 16, as shown in the present drawings, but this upper transparent layer is not essential. When it is used, it is preferably larger in diameter than the disk 16 and it is preferably mounted in a rotatable manner upon the disk 16. This may be accomplished by securing it to the disk 16 and the bearing 15 by means of an eyelet 20.

Rotatably mounted on the bearing 15 is a unitary structure which includes the sights 21 and 22. I have shown the sight 21 provided with a circular sighting aperture 23 and with a centrally disposed notch 24 whose purpose will be presently described. I have shown the sight 22 provided with an elongated slit 25 within which a transparent window 26 (composed of Cellophane or equivalent thin transparent material) may be mounted, if desired. The sights 21 and 22 are connected at their bases to a strip which extends between them and which lies in the space between the backing 10 and the compass disk 16. This structure may be conveniently composed of a single element of sheet material, such as cardboard, as is indicated most clearly in Figs. 5 and 6.

Figure 6:
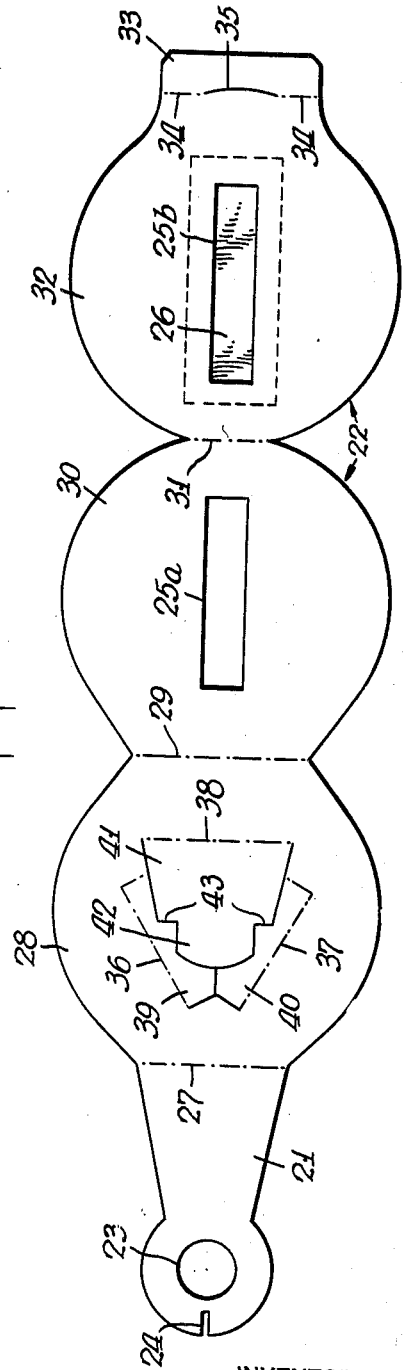
Fig. 6 is a plan view of a blank of sheet material of which one of the elements of the device may be constructed.

In the preferred construction, a blank of material is cut, shaped, and scored, to define hingedly connected panels as indicated in Fig. 6. The panel at the left of Fig. 6 defines the sight 21, and it is joined at the hinge line 27 to the panel or strip 28 which is preferably of the enlarged character shown. This strip is in turn hingedly connected as at 29 to a panel 30 which connects at the hinge line 31 with the panel 32. The panels 30 and 32 are substantially identical in general contour and are adapted to be brought together into superposed relationship (by folding along the line 31) to define the sight 22 which is thus of two-ply construction. The slit 25a in the panel 30 registers with the slit 25b in the panel 32 when the parts are brought together, so as to form the desired slit 25 as indicated in Figs. 1 and 2. The parts 30 and 32 are preferably held together by adhesive means, and during the process of assembling them the strip 26 (where such a strip is used) may be inserted.

At the end of the panel 32 a flap 33 is provided, hinged to the panel 32 along the line 34. The midportion of the hinge line 34 is cut completely through to provide the slot 35 whose function will be presently described.

It will be obvious that the panel 28 constitutes the strip portion which connects the sights at their bases, i. e., along the lines 27 and 29. The strip 28 is therefore provided with an aperture which snugly accommodates the bearing 15 so as to permit the desired rotatability to be achieved. In providing an aperture in the midportion of the panel 28, I first form hinge lines 36, 37 and 38 at substantially 60° to each other, and I then cut completely through the material of the strip 28 along the lines indicated in Fig. 6 so as to form the three flaps 39, 40 and 41. The flap 41 is folded back beneath the body of the strip 28, as shown most clearly in Fig. 5, and it is provided with a tongue 42 which is of such a shape and size that it may pass freely through the slot 35 when the flap 33 is folded into the position shown in Figs. 3 and 5. The flaps 39 and 40 are similarly folded beneath the body of the panel 28, as shown most clearly in Fig. 5 and thereby an aperture is provided which has a shape substantially like an equilateral triangle with blunt corners. Score lines 36, 37 and 38 are provided in such relationships to each other, and to the diameter of the bearing element 15, that the latter fits snugly into the aperture and bears tangentially against the folded-back regions defined by the score lines 36, 37 and 38. Thus, the strip 28, and the sights carried by it, are rotatably journaled on the bearing 15 to permit free rotation about an axis concentric with the compass disk 16.

When the device is used, the sights 21 and 22 are adjusted upwardly into the substantially parallel vertical positions shown in Figs. 1, 2 and 3. At least one of the sights is provided with a special means for frictionally retaining it in this upright position, and in the illustrated construction I have shown this special retaining means associated with the sight 22. It consists of the frictional interengagement between the tongue portion 42 of the flap 41 and the slot 35. These portions press frictionally against each other when the sight is adjusted upwardly, as indicated in Fig. 3, this desired result being achieved by virtue of the fact that the distance from the hinge line 31 to the hinge line 34 is slightly larger than the distance between the hinge line 31 and the hinge line 29. When the sights are folded downwardly onto the compass disk, as indicated in dot-and-dash lines in Fig. 3, the tongue 42 lies substantially against the under surface of the strip 28, but when the sight 22 is adjusted upwardly, the tongue 42 is deflected downwardly by a slight amount thus increasing its frictional pressure against the wall of the slot 35. Moreover, the upward adjustment of the sight 22 is halted when the sight reaches a truly vertical position, by the shoulder 43 between the tongue 42 and the body of the flap 41, and an accurate vertical disposition of the sight is thus assured.

When the device is not in use, it is contemplated that the extensions 13 and 14 of the backing will be folded over the operative portions. When the device is to be used, the sights 21 and 22 are adjusted upwardly and the student is made to assume that a certain fixed part of his environment is "north." He then holds the backing in such a way that the "north" designation on the compass disk 16 is directed approximately toward this arbitrarily-declared northerly direction. He is then free to rotate the sights so that the line of sight between them coincides with any desired direction. For example, he may be directed to ascertain the direction of a certain tree or similar objective. To do this, he places his eye to the aperture 23 of the sight 21, and rotates the sights until the tree or objective becomes visible in the slot 25 of the sight 22. He then removes his eye from the sight opening 23 and observes the relationship which the sights now have with respect to the degree markings on the disk 16. To facilitate this determination, he may, if he so desires, fold the sight 21 downwardly onto the disk 16 so that the notch 24 will focus his attention accurately upon the direction he is seeking to determine. In a similar way, he may be arbitrarily informed that a certain objective such as a tree or the like, has a certain specified compass direction, and he may be asked, on this assumption, to determine which direction is "north." To do this, he would rotate the sights into registry with the given direction, he would then look through the sight opening 23 and turn bodily until the objective came within his line of sight through the slot 25, and the marking 17 on the disk 16 would then point in the direction he was asked to determine.

By exercises of this character, and by corresponding manipulations and study of the relationships of the parts with respect to different "sights" through the opening 23 and the slot 25, the student is thus rapidly enabled to become not only familiar with the general art of orientation by compass, but with the nature and mode of operation of an actual compass which he will ultimately be called upon to manipulate and use.

Where the transparent additional disk 19 is employed, it may be provided with radial markings either luminous or otherwise, to facilitate the readings which are to be made on the disk 16 and to familiarize the student with corresponding auxiliary parts that may be employed on an actual compass.

It will be understood that the particular shapes of the parts involved, and of the other details herein described and illustrated, may be modified by those skilled in the art without departing from the spirit and scope of the invention as expressed in the appended claims.

Having thus described my invention and illustrated its use, what I claim as new and desire to secure by Letters Patent is:

1. An educational device for teaching orientation by compass, comprising a flat supporting backing, means fixedly associated with said backing and bearing indicia simulating the magnetically-movable element of a compass and a set of circumferentially-arranged degree markings, cooperable front and rear sights arranged at diametrically opposite portions of said set of markings, and means securing said sights to said backing to allow rotation thereof as a unit about an axis concentric with said set of markings.

2. An educational device for teaching orientation by compass, comprising a flat supporting backing, means fixedly associated with said backing and bearing indicia simulating the magnetically-movable element of a compass and a set of circumferentially-arranged degree markings, cooperable front and rear sights arranged at diametrically opposite portions of said set of markings, and means securing said sights to said backing to allow rotation thereof as a unit about an axis concentric with said set of markings, said securing means comprising a strip connecting said sights at the bases thereof, the midportion of said strip being rotatably secured to said backing.

3. An educational device for teaching orientation by compass, comprising a flat supporting backing, means fixedly associated with said backing and bearing indicia simulating the magnetically-movable element of a compass and a set of circumferentially-arranged degree markings, cooperable front and rear sights arranged at diametrically opposite portions of said set of markings, and means securing said sights to said backing to allow rotation thereof as a unit about an axis concentric with said set of markings, said securing means comprising a strip connecting said sights at the bases thereof, the midportion of said strip being rotatably secured to said backing, said sights and connecting strip forming hingedly-connected portions of a single blank of cardboard, the sights being foldable along their respective hinge lines to permit adjustment either upwardly into spaced substantially vertical planes or downwardly into substantially horizontal planes.

4. An educational device for teaching orientation by compass, comprising a flat supporting backing, a disk fixedly mounted on said backing and bearing indicia simulating the magnetically-movable element of a compass and a set of circumferentially-arranged degree markings, cooperable front and rear sights arranged at diametrically opposite portions of said disk, and means beneath said disk securing said sights to said backing to allow rotation thereof as a unit about an axis concentric with said disk.

5. An educational device for teaching orientation by compass, comprising a flat supporting backing, a disk fixedly mounted on said backing and bearing indicia simulating the magnetically-movable element of a compass and a set of circumferentially-arranged degree markings, cooperable front and rear sights arranged at diametrically opposite portions of said disk, and means beneath said disk securing said sights to said backing to allow rotation thereof as a unit about an axis concentric with said disk, said securing means comprising a strip arranged beneath said disk and connecting said sights at the bases thereof, the midportion of said strip being rotatably secured to said backing.

6. An educational device for teaching orientation by compass, comprising a flat supporting cardboard backing, a cardboard disk fixedly mounted on said backing and bearing indicia simulating the magnetically-movable element of a compass and a set of circumferentially-arranged degree markings, cooperable front and rear sights arranged at diametrically opposite portions of said disk, and means beneath said disk securing said sights to said backing to allow rotation thereof as a unit about an axis concentric with said disk, said securing means comprising a strip arranged beneath said disk and connecting said sights at the bases thereof, the midportion of said strip being rotatably secured to said backing, said sights and connecting strip forming hingedly-connected portions of an element of cardboard, the sights being foldable along their respective hinge lines to permit adjustment either upwardly into spaced parallel vertical planes or downwardly into substantially parallel horizontal planes.

7. An educational device for teaching orientation by compass, comprising a flat supporting backing, a disk fixedly mounted on said backing and bearing indicia simulating the magnetically-movable element of a compass and a set of circumferentially-arranged degree markings, cooperable front and rear sights arranged at diametrically opposite portions of said disk, and means beneath said disk securing said sights to said backing to allow rotation thereof as a unit about an axis concentric with said disk, said securing means comprising a strip arranged beneath said disk and connecting said sights at the bases thereof, the midportion of said strip having an aperture therein, and a bearing carried by the backing and extending into said aperture.

8. An educational device for teaching orientation by compass, comprising a flat supporting backing, a disk fixedly mounted on said backing and bearing indicia simulating the magnetically-movable element of a compass and a set of circumferentially-arranged degree markings, cooperable front and rear sights arranged at diametrically opposite portions of said disk, and means beneath said disk securing said sights to said backing to allow rotation thereof as a unit about an axis concentric with said disk, said securing means comprising a strip arranged beneath said disk and connecting said sights at the bases thereof, the midportion of said strip having cut portions folded back onto the strip to define an aperture, and a bearing carried by the backing and extending into said aperture.

9. An educational device as set forth in claim 8, said backing, disk, and bearing comprising interconnected superposed cardboard elements, said sights and connecting strip forming hingedly-connected portions of another element of cardboard.

10. An educational device as set forth in claim 3, in combination with means for frictionally retaining at least one of said sights in substantially vertical position when it is adjusted upwardly.

11. An educational device as set forth in claim 3, in combination with means for frictionally retaining at least one of said sights in substantially vertical position when it is adjusted upwardly, said means comprising cooperable portions on said strip and sight arranged so as to press frictionally against each other when the sight is adjusted upwardly.

JOHN V. HORR